United States Patent Office 2,865,934
Patented Dec. 23, 1958

2,865,934

EXTRACTION OF ERGOSTEROL AND ERGOS-TEROL-LIKE STEROLS FROM YEAST AND ANALOGOUS PRODUCTS

Robert A. Fisher, Bakersfield, Calif., assignor, by mesne assignments, to Bioferm Corporation, Wasco, Calif., a corporation of Illinois No Drawing. Application February 21, 1955
Serial No. 489,795

13 Claims. (Cl. 260—397.25)

My invention relates to new and useful methods for the extraction of ergosterol and ergosterol-like sterols from yeast and analogous molds, fungi and the like such as *Aspergillus niger*, citric acid producing molds, penicillum molds, etc., hereafter, for convenience, generally called "fungi." The invention has particular importance in relation to yeast products specifically as, for instance, autolyzed yeast; autolyzed yeast residues remaining after the removal of water-soluble solids therefrom; yeast residues resulting from the production of invertase, maltase and other products obtained by aqueous extraction and filtration of yeast masses; as well as from straight primary grown yeast or brewer's yeast.

Heretofore known methods for the extraction of ergosterol from yeast have suffered a number of serious disadvantages. At least most of the traditional methods which have come into any commercial use at all employ two basic steps, namely, the complete or substantially complete destruction of non-sterol matter by means of a combined digestion-saponification procedure, and the subsequent extraction of the resulting digested material by means of a suitable organic solvent and from which resulting solvent solution the ergosterol and allied sterols are recovered. The chief disadvantages of such procedures are (1) that the ergosterol and allied sterols represent the only salable product that can effectively be recovered, and (2) that the organic solvent utilized undergoes dilution and/or building up of non-sterol and sterol-like impurities and this results in high organic solvent recovery costs and requires exhaustive purification steps to yield high purity ergosterol.

I have evolved a new and highly useful method for the extraction of ergosterol and ergosterol-like sterols from fungi which is simple to carry out, results in high recoveries of ergosterol and ergosterol-like sterols, enables useful and salable by-products to be recovered and, in general, makes possible very substantial economies.

In general, in accordance with my novel method, the yeast product, in the form of a liquid, which may be a solution or a suspension, particlarly in an aqueous medium, is subjected to a pretreatment procedure which includes treatment with an alkali, particularly a dilute alkali, to produce a pH between approximately 9 and approximately 11, more particularly a pH of about 9.8 to about 10.2, and especially a pH of about 10. In any event, the pH is such that when the resulting yeast product solution or suspension is subjected to the next step, namely, the drying step, the cells of the yeast product are ruptured and the ergosterol released without, however, at the same time destroying the cell contents. In addition, the treatment converts the yeast product to a form which is readily storable, without refrigeration or other special storage conditions, for treatment at any desired subsequent time for extraction of the ergosterol and ergosterol-like sterols. The drying step can be carried out with various types of drying equipment as, for instance, pan driers, belt driers, roll or drum driers and also other kinds of drying apparatus. The drying temperatures is also variable depending, at least in part, on the pH of the yeast or fungi solution or suspension, the particular fungi being treated, and upon the drying time, but in all cases it is important that these factors be so correlated that rupture of the yeast cells takes place, with consequent release of ergosterol, but without effecting destruction of the yeast cell contents. In general, a satisfactory operating range of temperatures is from about 250 to about 375 degrees F. but, as stated, such a range is not a limiting one. Suitable conditions of time and temperature can readily be ascertained, in the light of my disclosure herein, to achieve rupture of the yeast cells and release of ergosterol without destruction of the yeast cell contents. I find it especially desirable to use an atmospheric drum drier the surface of which is maintained at a temperature (about 275–340 degrees F.) resulting from operating at steam pressures of the order of about 30 to about 100 pounds per square inch.

The alkali treated dried yeast product is then extracted with an organic solvent, particularly a water-miscible organic solvent, in which the ergosterol and ergosterol-like sterols are soluble, typical examples of such solvents being ethanol, methanol, isopropanol, acetone, ethyl acetate and n-propyl alcohol. It is especially desirable to utilize a water-miscible organic solvent diluted with up to about 30% by volume of water, particularly 90 percent ethanol or 90 percent isopropanol. Water-immiscible organic solvents such as hexane, heptane and benzene may also be used to extract ergosterol and ergosterol-like sterols from the alkali treated dried yeast product. The retained organic solvent may be removed from the dried yeast product by pressing in a plate and frame press. The last traces of organic solvent may be removed from the dried yeast product by subjecting the dried yeast product to a current of warm air in a suitable drying device. The substantially sterol-free and fat-free yeast product is thus readily recovered as a dry by-product and has salable value as feed material as well as for other purposes.

The organic solvent solution containing the ergosterol and ergosterol-like sterols is treated to remove the organic solvent. This is readily done by distillation in a simple pot still and, since little or no dilution of the organic solvent has occurred in the extraction step, the recovered solvent can be re-used in subsequent or further extraction operations.

The residue, containing the ergosterol and ergosterol-like sterols and fats, is then treated with relatively strong alkali, for instance at a pH of about 11 to about 13, preferably at 11.5 to 12.5, at a relatively high temperature, preferably within the range of about 75 to about 90 and, better still, at about 80 to 85 degrees C., for the purpose of saponifying the fats. The resulting saponified liquor is diluted with water, usually several volumes of water, and then neutralized with an acid, preferably an inorganic acid such as hydrochloric acid, sulfuric acid or phosphoric acid, to reduce the pH to about 5.8 to about 6 or 6.1. This results in releasing or freeing the sterols from solution in the soaps, the sterols being recovered as described below. At this point, however, it may be noted that the nature of the sterol recovery can be controlled by control of the pH to which the saponified liquor is neutralized. Thus, substantially complete recovery of the sterols, comprising both the ergosterol and the ergosterol-like sterols, can be effected if the pH is reduced to about 6, the recovered product in such case being a crude crystalline product containing about 65% ergosterol. If the saponified liquor is not neutralized with acid, a crude crystalline product can be recovered containing up to about 97% ergosterol. At pH values between about 6 and the pH of the original saponified liquor, the recovery of the sterols will range between about 65% and about 97%. The recovery of the sterols from the neutralized or unneutralized saponified liquor is effected by filtering the saponified liquor through a bed of filter-aid, throughly washing the bed with water to remove soaps and salts, drying the filter cake, which may be done by blowing air therethrough, and then dissolving the sterols out of the filter cake by repulping it with, or passing through the filter cake body, any suitable organic solvent as, for example, ethanol, ethanolbenzene, isopropanol, or petroleum naphtha. Advantageously, the organic solvent is utilized at somewhat elevated temperatures, preferably not less than about 15 degrees C. below the boiling point of the particular organic solvent used. The hot solvent is then chilled in a conventional crystallizer to recover the crystalline sterols. Analytical grade ergosterol with an extinction coefficient above 268 can be obtained by further crystallization from any suitable organic solvent such as those mentioned above.

The following example is illustrative of the practice of the method of the present invention. It will be appreciated that various changes may be made in the nature of the fungi being treated, and different organic solvents, different temperatures and proportions can be employed within the teachings and scope of my invention in the light of the guiding principles disclosed herein.

*Example*

An autolyzed yeast residue, prepared from brewer's yeast, containing 193.5 pounds of yeast residue solids in the form of an aqueous suspension containing 11% of solids, was admixed with 11 pounds (or 5.7% of the yeast residue solids) of sodium hydroxide in the form of a dilute aqueous solution, whereby to produce an alkalinity in the suspension of pH 10, and the resulting mixture was then dried on an atmospheric drum dryer operating under a stream pressure of between 50 and 70 pounds per square inch. The resulting dried yeast product was then removed from the drum by a conventional doctor blade.

100 grams of this dried alkali-treated yeast was then extracted with 400 ml. of 90% isopropyl alcohol, the suspension was stirred for 2 minutes at 65 degrees C. and filtered by suction. A second extraction of the alkali-treated dried yeast was made with 300 ml. of 90% isopropyl alcohol, the suspension was stirred for 2 minutes at 65 degrees C. and filtered by suction. A total of 507 ml. of extracted solvent was recovered.

The extracted solvent was distilled in a conventional pot still until the temperature of the vapor rose above 83 degrees C. Approximately 479 ml. of approximately 91% isopropyl alcohol was recovered. The residue comprised 28 ml. of a dark orange fatty material.

To the said dark orange fatty material there were added 250 ml. of 15% sodium hydroxide and the mixture was heated at 80–85 degrees C. with occasional stirring for a period of about 10 minutes. The total volume at this stage of the process was 278 ml.

The saponified liquor was admixed with 556 ml. (2 volumes) of tap water and the resulting diluted saponified liquor was then cooled to room temperature (24 degrees C.). The volume at this stage was 834 ml. There was then added 153.5 ml. of aqueous sulfuric acid (made by mixing 25.6 ml. conc. sulfuric acid with 127.9 ml. water) to reduce the pH from 12 to 6. A dark brown floc separated out and floated to the surface. The volume of the liquid was now 987.5 ml.

The liquid was then filtered through a filter bed made up of 33 grams of standard Super-Cel, a filter aid, supported on Whatman No. 1 filter paper, 17 grams of said Super-Cel being added to the liquid prior to the filtration thereof. Filtration was effected with suction, at room temperature, and the filter cake was washed with about 500 ml. of tap water until the filtrate was salt-free. The filter cake was then dried by suction.

The filter cake was then repulped in 555 ml. of 98% isopropyl alcohol at 65 degrees C. The resulting suspension was filtered by gravity and the filtrate was diluted to an appropriate level to determine optical density at 281.5 mu and at 230 mu against 98% isopropyl alcohol in the Beckmann spectro-photometer.

197 mg. of ergosterol and 107 mg. of an ergosterol-like sterol (pseudo ergosterol) were recovered. This represents a recovery of 87.3% of the total of the ergosterol and the pseudo ergosterol based upon the input thereof. The percent recovery of the ergosterol was 82.1% and the percent recovery of the pseudo ergosterol was 99.1%, based upon the input. Of the crude sterol recovered, the ergosterol represented 64.8% and the pseudo ergosterol represented 35.2%.

This application is a continuation-in-part of my prior application Serial No. 333,815, filed January 28, 1953.

What I claim as new and desire to protect by Letters Patent of the United States is:

1. In a method of extracting ergosterol from liquid fungi products, the steps which include admixing said liquid fungi products with alkali to produce a pH in the range of about 9 to about 11, drying said liquid fungi products whereby to rupture the cells and release the ergosterol contained therein but without destroying the contents of the cells, then extracting the dried fungi products with a liquid organic solvent in which ergosterol and fatty material present in the dried fungi products are soluble, filtering, distilling off at least most of said organic solvent from the filtrate whereby to leavy a fatty residue, saponifying said residue with a strong alkali at elevated temperatures, diluting the saponified liquor with water, acidifying to reduce the pH to not substantially below pH 6 whereby to effect release of the ergosterol from the soaps, filtering through a filter bed containing a filter aid, washing the filter cake with water until the filtrate is substantially free of salts, dissolving the ergosterol out of said filter cake by contacting said filter cake with an organic solvent in which ergosterol is soluble, and recovering the ergosterol from said organic solvent.

2. In a method of extracting ergosterol from a yeast liquid, the steps which include admixing said yeast liquid with alkali to produce a pH in the range of about 9 to about 11, drying said yeast liquid on a drum dryer whereby to rupture the cells and release the ergosterol contained therein but without destroying the contents of the cells, then extracting the dried yeast product with a liquid organic solvent in which ergosterol and fatty material present in the dried yeast product are soluble, filtering, distilling off at least most of said organic solvent from the filtrate whereby to leave a fatty residue, saponifying said residue with a strong alkali at a pH of about 11.5 to about 12.5 at a temperature between about 75 and about 90 degrees C., diluting the saponified liquor with water, cooling to about room temperature, adding sulfuric acid to reduce the pH to about 6 whereby to effect release of the ergosterol from the soaps, filtering through a filter bed containing a filter aid, washing the filter cake with water until the filtrate is substantially free of salts, drying the filter cake, dissolving the ergosterol out of said filter cake by contacting said filter cake with an organic solvent in which ergosterol is soluble, and recovering the ergosterol from said organic solvent.

3. In a method of extracting ergosterol from an aqueous suspension of yeast solids, the steps which include admixing said yeast suspension with an alkali to produce a pH of about 10, drying said yeast suspension on an atmospheric drum dryer at a temperature equivalent to a steam pressure of about 30 to about 100 pounds per square inch whereby to rupture the cells and release the ergosterol contained therein but without destroying the contents of the cells, then extracting the dried yeast product with a water-miscible liquid organic solvent in which ergosterol and fatty material present in the dried yeast product are soluble, filtering, distilling off at least most of said organic solvent from the filtrate whereby to leave a fatty residue, saponifying said residue with a strong alkali at a pH of about 11.5 to about 12.5 at a temperature in the range of about 80 to about 85 degrees C., diluting the saponified liquor with a substantial volume of water, adding sulfuric acid to reduce the pH to about 6 whereby to effect release of the ergosterol from the soaps, filtering through a filter bed containing a filter aid, washing the filter cake with water until the filtrate is substantially free of salts, drying the filter cake, dissolving the ergosterol out of said filter cake by contacting said filter cake with a hot organic solvent in which ergosterol is soluble, and chilling said solvent to recover the ergosterol therefrom.

4. In a method of extracting ergosterol from liquid fungi products, the preliminary steps which include admixing said liquid fungi products with an alkali to produce a pH in the range of about 9 to about 11, and drying said liquid fungi products whereby to rupture the cells and release the ergosterol contained therein but without destroying the contents of the cells.

5. In a method of extracting ergosterol from a yeast liquid, the preliminary steps which include admixing said yeast liquid containing from about 5% to about 15% solids with an alkali to produce a pH in the range of about 9 to about 11, and drying said yeast liquid on a drum dryer whereby to rupture the cells and release the ergosterol contained therein but without destroying the contents of the cells.

6. In a method of extracting ergosterol from an aqueous suspension of yeast solids, the preliminary steps which include admixing said yeast liquid containing from about 10% to about 12% solids with sodium hydroxide to produce a pH of about 10, and drying said yeast liquid on an atmospheric drum dryer at a temperature equivalent to a steam pressure of about 30 to about 100 pounds per square inch whereby to rupture the cells and release the ergosterol contained therein but without destroying the contents of the cells.

7. In a method of extracting ergosterol from mixtures containing predominantly fatty materials and ergosterol, the steps which comprise saponifying said mixtures with a strong alkali at elevated temperatures, diluting the saponified liquor with water, acidifying the saponified liquor to reduce the pH to not substantially below pH 6 whereby to effect release of the ergosterol from the soaps, filtering through a filter bed containing a filter aid, washing the filter cake with water until the filtrate is substantially free of salts, dissolving the ergosterol out of said filter cake by contacting said filter cake with an organic solvent in which ergosterol is soluble, and recovering the ergosterol from said organic solvent.

8. In a method of extracting ergosterol from mixtures derived from yeast and in which mixtures the predominant ingredients are fatty materials, ergosterol and ergosterol-like sterols, the steps which comprise saponifying said mixtures with alkali at a pH of about 11.5 to about 12.5 at temperatures between about 75 and about 90 degrees C., diluting the saponified liquor with several volumes of water, adding an acid to reduce the pH to about 6 whereby to effect release of the ergosterol from the soaps, filtering through a filter bed containing a filter aid, washing the filter cake with water until the filtrate is substantially free of salts, drying the filter cake, dissolving the ergosterol out of said filter cake by contacting said filter cake with an organic solvent in which ergosterol is soluble, and recovering the ergosterol from said organic solvent.

9. In a method of extracting ergosterol from mixtures containing predominately fatty materials and ergosteral, the steps which comprise saponifying said mixtures with a.. alkali at elevated temperatures, acidifying the saponified liquor to reduce the pH to not substantially below pH 6 whereby to effect release of the ergosterol from the soaps, filtering through a filter bed containing a filter aid, washing the filter cake with water until the filtrate is substantially free of salts, dissolving the ergosterol out of said filter cake by contacting said filter cake with an organic solvent in which ergosterol is soluble, and recovering the ergosterol from said organic solvent.

10. In a method of extracting ergosterol from mixtures derived from yeast and in which mixtures the predominant ingredients are fatty materials, ergosterol and ergosterol-like sterols, the steps which comprise saponifying said mixtures with an alkali at a pH of about 11.5 to about 12.5 at temperatures between about 75 and about 90 degrees C., adding an acid to reduce the pH to not substantially below pH 6 whereby to effect release of the ergosterol from the soaps, filtering through a filter bed containing a filter aid, washing the filter cake with water until the filtrate is substantially free of salts, dissolving the ergosterol out of said filter cake by contacting said filter cake with an organic solvent in which ergosterol is soluble, and recovering the ergosterol from said organic solvent.

11. In a method of extracting ergosterol from liquid fungi products, the steps which include admixing said liquid fungi products with an alkali to produce a pH in the range of about 9 to about 11, drying said liquid fungi products whereby to rupture the cells and release the ergosterol contained therein but without destroying the contents of the cells, then extracting the dried fungi products with a liquid organic solvent in which ergosterol and fatty material present in the dried fungi products are soluble, filtering, distilling off at least most of said organic solvent from the filtrate whereby to leave a fatty residue, saponifying said residue with an alkali at elevated temperatures, filtering, washing the residue with water until the filtrate is substantially free of salts, dissolving the ergosterol out of said residue by contacting said residue with an organic solvent in which ergosterol is soluble, and recovering the ergosterol from said organic solvent.

12. In a method of extracting ergosterol from a yeast liquid, the steps which include admixing said yeast liquid with an alkali to produce a pH in the range of about 9 to about 11, drying said yeast liquid at a temperature between about 250 and about 375 degrees F. to rupture the cells and release the ergosterol contained therein but without destroying the contents of the cells, then extracting the dried yeast product with a liquid organic solvent in which ergosterol and fatty material present in the dried yeast product are soluble, filtering, distilling off at least most of said organic solvent from the filtrate whereby to leave a fatty residue, saponifying said residue, filtering through a filter bed containing a filter aid, washing the filter cake with water until the filtrate is substantially free of salts, dissolving the ergosterol out of said filter cake by contacting said filter cake with an organic solvent in which ergosterol is soluble, and recovering the ergosterol from said organic solvent.

13. In a method of extracting ergosterol from an aqueous suspension of yeast solids, the steps which include admixing said yeast suspension with an alkali to produce a pH of about 10, drying said yeast suspension on an atmospheric drum dryer at a temperature equivalent to a steam pressure of about 30 to about 100 pounds per square inch whereby to rupture the cells and release the ergosterol contained therein but without destroying the contents of the cells, then extracting the dried yeast product with a water-miscible liquid organic solvent in which ergosterol and fatty material present in the dried yeast product are soluble, filtering, distilling off at least most of said organic solvent from the filtrate hereby to leave a fatty residue, saponifying said residue, adding an acid to reduce the pH to not substantially below 6 whereby to effect release of the ergosterol from the soaps, filtering, washing the residue with water until the filtrate is substantially free of salts, dissolving the ergosterol out of said filter cake by contacting said filter cake with a hot organic solvent in which ergosterol is soluble, and chilling said solvent to recover the ergosterol therefrom.

(References on following page)

References Cited in the file of this patent

UNITED STATES PATENTS

| | | |
|---|---|---|
| 1,733,009 | Gams | Oct. 22, 1929 |
| 1,842,929 | Bills | Jan. 26, 1932 |
| 1,893,317 | Zimmerli | Jan. 3, 1933 |
| 2,296,794 | Kruse | Sept. 22, 1942 |
| 2,355,661 | Light | Aug. 15, 1944 |
| 2,395,115 | Goering | Feb. 19, 1946 |

FOREIGN PATENTS

| | | |
|---|---|---|
| 178,507 | Japan | Apr. 16, 1949 |